(No Model.)

J. BROUGHTON.
Clamp for Hose Connections.

No. 235,931.  Patented Dec. 28, 1880.

Witnesses:
Fredr Haynes
E. P. Jessup.

Inventor:
John Broughton
by his Attorneys

United States Patent Office.

JOHN BROUGHTON, OF BROOKLYN, NEW YORK.

CLAMP FOR HOSE-CONNECTIONS.

SPECIFICATION forming part of Letters Patent No. 235,931, dated December 28, 1880.

Application filed May 4, 1880. (No model.)

*To all whom it may concern:*

Be it known that I, JOHN BROUGHTON, of Brooklyn, in the county of Kings and State of New York, have invented a certain new and Improved Clamp for Hose-Connections, of which the following is a specification.

My invention relates to clamps which are employed for clamping or securing hose upon nozzles or upon the parts of hose-couplings.

The invention consists in a clamp adapted to embrace or encircle the hose, provided with an outwardly-projecting screw-threaded stud and a nut fitted thereto, and divided through said stud transversely to the width of the said clamp. After placing the clamp in position the two portions of the stud are brought together by a pressure upon opposite sides of the clamp, which binds the hose securely upon the nozzle or coupling to which it is to be secured, and the nut is then applied to the stud to hold the clamp from spreading.

In order to provide for grasping the clamp to close it, I may construct it with a boss, from which the stud projects, and which is of greater diameter than the nut, so that when the opposite edges of the said boss are grasped in a vise or by nippers to close the clamp the turning of the nut will not be interfered with.

Figure 4:
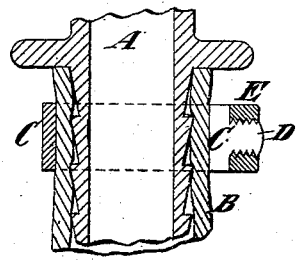
Figure 2:
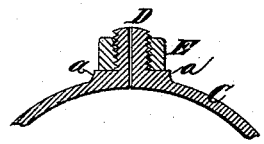
Figure 1:
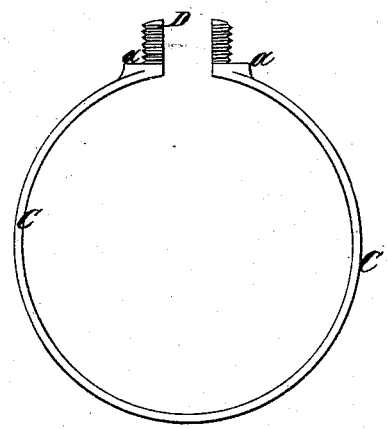
Figure 3:
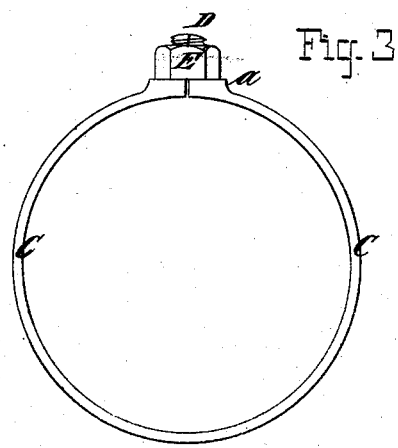

In the accompanying drawings, Figure 1 represents a face view of my improved clamp when spread apart. Fig. 2 represents a section through the divided stud and nut. Fig. 3 represents a face view of the clamp when closed and held by the nut applied to the stud; and Fig. 4 represents a longitudinal section through a portion of a nozzle or coupling and hose, illustrating the method of applying the clamp.

Similar letters of reference designate corresponding parts in all the figures.

A designates a portion of a nozzle or coupling, and B designates a hose which fits over the same, and is to be secured thereon so as to prevent leakage. The nozzle or coupling is provided with the usual annular grooves or recesses, into which the hose is pressed by the clamping device employed.

C designates the clamp or band, which is provided with a screw-threaded stud, D, projecting outward from the outside thereof, and which is divided through said stud transversely to the width of the clamp. The clamp or band is of a size to permit it to be readily slipped over the hose when spread apart or open, but small enough to exert a pressure on or squeeze the hose when closed sufficient to force the hose into said grooves or recesses.

E designates a nut applied to the stud D, and serving to hold the clamp in a closed position. After the clamp has been slipped upon the hose it is closed by pressure applied upon its opposite sides sufficiently to enable the nut E to be applied to the stud D, and, if desirable, the said stud and nut might be tapered, so that the nut may aid in drawing the clamp together. In order to enable the opposite sides of the clamp to be grasped in close proximity to the stud, I provide a hub or boss, $a$, from which said stud projects, and the edges of which may be grasped in a vise or by nippers for the purpose of closing the clamp. When so constructed the diameter of said boss should be greater than the diameter of the nut E, so that when the edges of said boss are held in the jaws of a vise or nippers the nut may be applied to said stud and readily turned without interfering with said jaws.

By my invention I provide a very simple clamp, which may be readily applied and the stud of which projects but slightly from the clamp itself.

What I claim as my invention, and desire to secure by Letters Patent, is—

1. A clamp adapted to embrace or encircle the hose, provided with an outwardly-projecting screw-threaded stud and a nut fitted thereto, and divided through said stud transversely to the width of the clamp, substantially as and for the purpose specified.

2. The transversely-divided clamp C, adapted to embrace or encircle the hose, provided with an outwardly-projecting screw-threaded stud, D, and a nut, E, fitted thereto, and also provided with a boss, $a$, larger in diameter than said nut, substantially as and for the purpose specified.

JOHN BROUGHTON.

Witnesses:
FREDK. HAYNES,
E. P. JESSUP.